United States Patent [19]

Dron et al.

[11] 4,276,489

[45] Jun. 30, 1981

[54] MULTIPLE COIL ELECTROMAGNETIC PICKUP

[75] Inventors: Sylvain M. Dron, Buc; Gérard M. G. Evrard, Livry Gargan, both of France

[73] Assignee: Societe Nationale d'Etude et de Construction de Moteurs d'Aviation, Paris, France

[21] Appl. No.: 58,489

[22] Filed: Jul. 18, 1979

Related U.S. Application Data

[63] Continuation of Ser. No. 843,542, Oct. 19, 1977, abandoned.

[30] Foreign Application Priority Data

Oct. 26, 1976 [FR] France .............................. 76 32673

[51] Int. Cl.$^3$ .......................................... H02K 21/38
[52] U.S. Cl. ..................................... 310/155; 310/168
[58] Field of Search ................................ 310/155, 168

[56] References Cited

U.S. PATENT DOCUMENTS

| 3,252,024 | 5/1966 | Loudon | 310/155 |
| 3,492,518 | 1/1970 | Wayne | 310/155 |
| 3,961,214 | 6/1976 | Lokhart | 310/155 |
| 4,011,478 | 3/1977 | Reenstra | 310/155 |

Primary Examiner—Donovan F. Duggan
Attorney, Agent, or Firm—Bacon & Thomas

[57] ABSTRACT

A multiple coil electromagnetic pickup converts into signals the flux variations produced by the passing of the teeth of a sound wheel. The pickup comprises at least two assemblies each consisting of at least one coil, one pole piece and one straight magnet all axially aligned, the assemblies being arranged in parallel to each other and magnetically insulated from each other by a screen. Measurement of rotational speed produces two output signals.

1 Claim, 2 Drawing Figures

U.S. Patent
Jun. 30, 1981
4,276,489
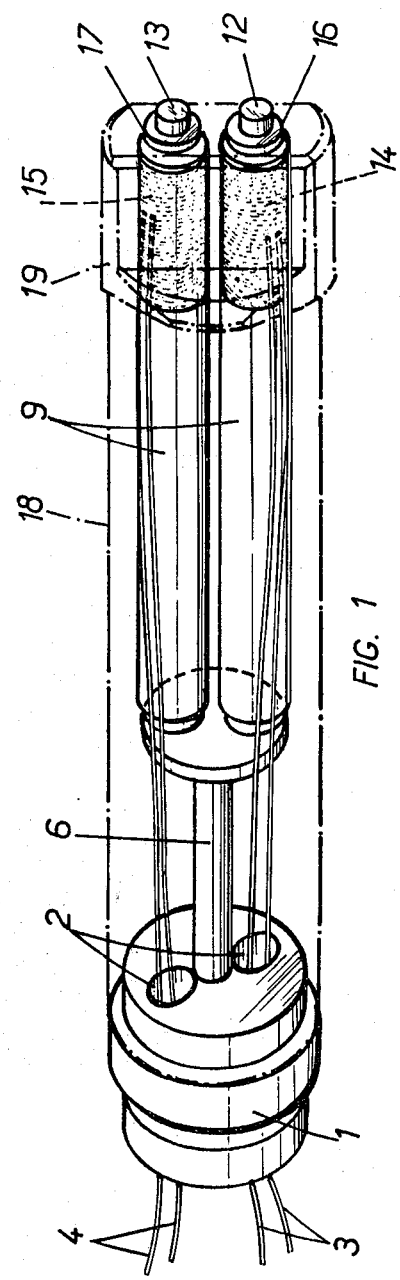
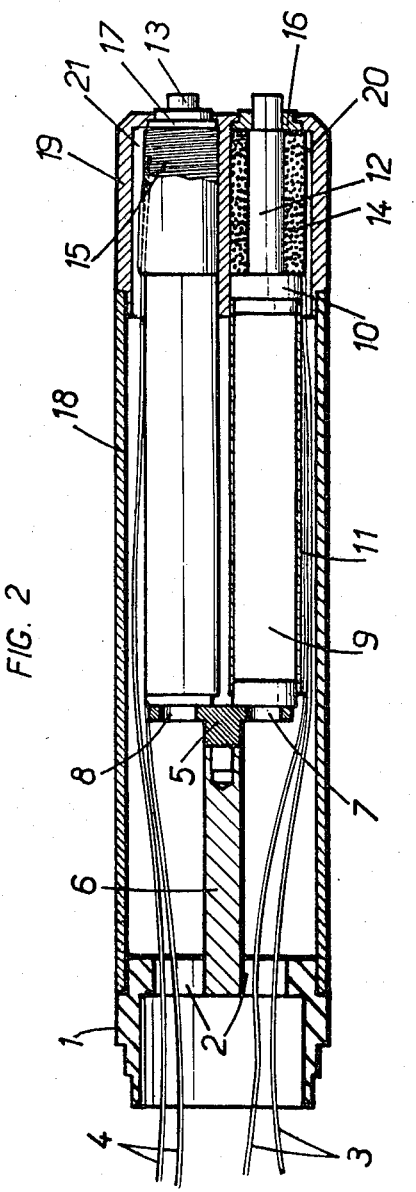
FIG. 1
FIG. 2

MULTIPLE COIL ELECTROMAGNETIC PICKUP

This is a continuation of application Ser. No. 843,542, filed Oct. 19, 1977 now abandoned.

BACKGROUND OF THE INVENTION

The invention pertains to speed measuring devices and more particularly to a multiple coil electromagnetic pickup capable of converting into signals the flux variations produced by the passing of the teeth of a sound wheel connected to a moving mechanism.

Such pick-ups are known, comprising a magnetic bar at the end of which is wound a multilayer coil. More generally, and in order to reduce the diameter of such pick-ups, the coil is mounted on a pole piece which is mechanically attached to the extremity of a bar with as small an air gap as possible. The use of electromagnetic pickups in aviation, and more generally in circuits which must have particularly high reliability, has led technicians to duplicate each device, resulting in more significant bulk. The problem is appreciably the same when it is necessary to reproduce the received information on a second reading or recording device. This requirement has led to the present technology, consisting of placing several windings on a single magnetic circuit. This technique entails certain drawbacks:

it produces a mutual inductance higher than 0.95; since the windings then behave as a transformer, every parasitic signal which arrives at one of the windings is transmitted to the others due to the inductive and capacitive effects. The result is that the operational reliability of devices connected to such windings is compromised;

when one winding is short-circuited, the output power available in the other is significantly attenuated and may affect the reliability of the system. In order to make this phenomenon acceptable, the pickup must be overdimensioned or the procedures of French Pat. No. 2,075,781 must be applied. According to that patent, the signal attenuation in the non-short-circuited coil is eliminated by magnetically coupling the two coils. Thus, when one of the coils is short-circuited, the induced voltage in the other coil increases slightly. The increase in the induced current in the short-circuited coil causes a larger inverse flux to develop in the core of the non-short-circuited coil and, consequently, an increase in the voltage supplied by the coil. A pickup embodied in this manner is a closed magnetic circuit pickup and is relatively difficult to make, given the fact that the two pole pieces form a stator, one of them being placed at one end of the magnet and the other at the end of the coils, which is not in contact with the magnet. This relatively bulky arrangement cannot yield a pickup of very small size.

Another proposal consists of winding multiple windings in accordance with the "several wires in hand" technique; but in this case the electrical insulation between the windings is weak and causes significant problems.

SUMMARY OF THE INVENTION

The multiple coil electromagnetic pickup according to the present invention is intended to eliminate the inherent drawbacks of the pickups described above. To this end, each winding is placed on an independent magnetic circuit and is shielded by electromagnetic screens. These screens are limited to the coil level in order not to short-circuit the magnets.

This arrangement eliminates the capacitive effect and markedly reduces mutual inductance.

Short-circuiting one of the coils does not entail a power drop on the other windings. For similar performance, the dimensions of each magnetic circuit are smaller and the association of these circuits does not entail increased dimension in comparison with current art.

The attenuation of parasities transmitted from one winding to the others is significant. It is very good for the lower frequencies, due to the substantial reduction of the mutual inductance, and is excellent for high frequency, due to the suppression of the capacitive effect.

Finally, the electrical insulation between coils is equivalent to that between coil and pole pieces.

The explanations and figures presented below as examples will make it possible to understand how the invention may be realized.

BRIEF DESCRIPTION OF THE DRAWINGS

FIG. 1 is a phantom perspective view of a pickup according to the invention, showing the inner components in solid lines.

FIG. 2 is a longitudinal cross-section of the pickup of FIG. 1.

DESCRIPTION OF THE PREFERRED EMBODIMENT

The electromagnetic pickup to be described is of the straight-line open circuit type, that is, where the lines of force of the magnetic circuit go through the pole piece, the magnet and a tooth of the sound wheel and reclose in the outside atmosphere.

According to the example shown in FIG. 1, this pickup is in the shape of a cylindrical body at one end of which two pole pieces project outward. These pole pieces are placed near the circumference of a toothed or sound wheel (not shown) and at such a distance from the extremity of the teeth that the air gap will be as small as possible.

The pickup comprises a fastening piece 1. This piece, which is made of a nonmagnetic material, is provided with openings 2 to allow passage of the connecting wires 3 and 4 leading to each coil. A support 5 is fixed to this piece by means of a brace 6. The support 5, made of nonmagnetic material, receives the ends of the two pole pieces 7 and 8, against whose faces abut two cylindrical magnets (FIG. 2 shows only one magnet 9). A second pole piece 10 is similarly fixed at the other end of the magnet.

The pole pieces such as 7 and 10 are advantageously kept assembled with the corresponding magnet such as 9 according to the assembly procedure described in U.S. patent application Ser. No. 703,304, filed July 7, 1976, which combines the use of a mechanical connection by means of a thin tube 11 made of nonmagnetic material, depicted on the lower half of FIG. 2, enclosing a portion of each pole piece adjacent to the ends of the magnet, in combination with soldering by electronic bombardment of the tube 11 on the pole piece portions adjacent to the magnet. The same arrangement and method are employed insofar as the second assembly mounted on the pole piece 8.

Each of the end pole pieces such as 10 is extended by a small diameter cylindrical part, such as 12 and 13, which constitute the cores of coils 14 and 15. These coils are held in place by end washers 16 and 17 made of a nonmagnetic material and soldered onto the cores 12 and 13.

According to the embodiment shown in FIG. 1, the electromagnetic screen which shields the electromagnetic circuits of the two coils from each other is in the form of a massive part 19 provided with two sockets 20 and 21 into which fit the coils 14 and 15. The cores 12 and 13 of the coils project outside piece 19 through two holes of appropriate diameter. According to the invention, the massive piece 19 is formed of a soft magnetic material such as a metal alloy of suitable composition.

A tube 18 made of a nonmagnetic material constitutes, outwardly of the magnets, a common casing for the two assemblies arranged in parallel (each consisting of a cylindrical magnet, its end pole pieces and a coil). The extremity of the tube 18 which is located near the coils connects onto piece 19. The nonmagnetic material comprising the tube 18 may be a stainless type alloy, the coupling onto the piece 19 being effected, for example, by fitting one piece within the other and soldering by electronic bombardment.

Each assembly consisting of a magnet, its end pole pieces and a coil is arranged so that the poles of the same polarity are on the same side. Thus, according to one example, the north poles of both the magnets are at the coil end.

The two assemblies are arranged in parallel with each other and slightly separated so that two independent magnetic circuits are established in a unit of approximately the same size as the single-coil pickup known to current art.

According to the example of FIGS. 1 and 2, the multiple coil pickup may be in the form of a cylinder 16 mm in diameter and 82 mm long. The coil cores would be 2.5 mm in diameter and the distance between axes 7 mm. Such a pickup is capable of delivering two signals with a strength of 5 to 10 mV under an effective 3 V.

The multi-coil electromagnetic pickup according to the invention is not limited to the example described. Thus, for example, the invention also covers embodiments of the closed magnetic circuit type. The part of the common casing that covers the magnets could take other shapes, such as a parallelepipedal box.

We claim:

1. An electromagnetic sensor comprising at least a pair of coils, each coil being part of an assembly comprising an axial arrangement of a coil and a straight magnet arranged end to end, said assemblies being parallel to each other, the magnet poles of the same polarity extending in the same direction, only the coil of each assembly being housed in a solid piece of a magnetic material, each magnet being in an essentially tubular non-magnetic housing.

* * * * *